(No Model.)
J. P. RADLEY.
LAWN RAKE.
No. 415,844.   Patented Nov. 26, 1889.
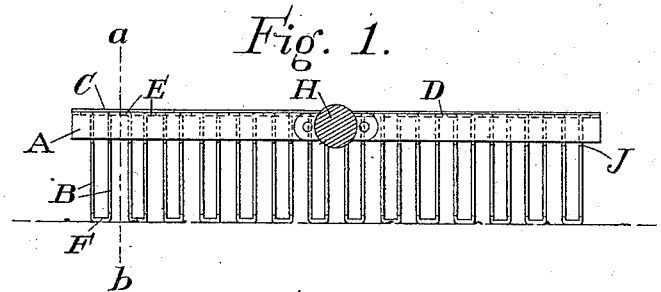
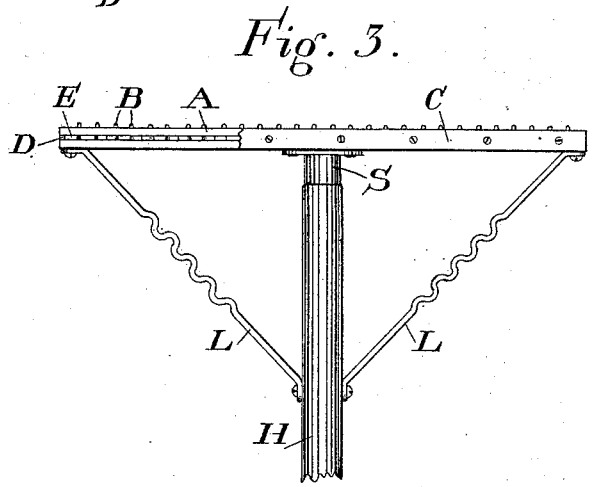
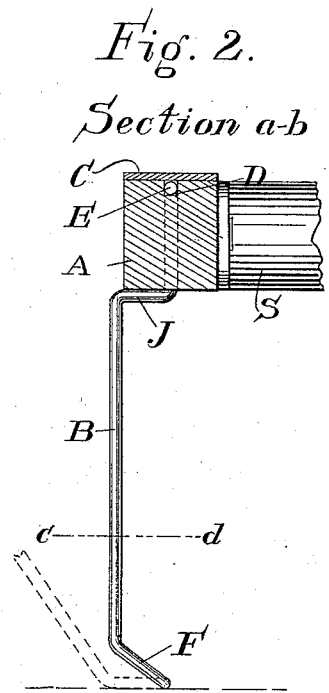
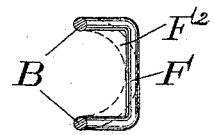
WITNESSES:
John N. Mayer
Grace T. Many
INVENTOR
John P. Radley
BY
Frederick W. Cameron.
ATTORNEY.

UNITED STATES PATENT OFFICE.

JOHN P. RADLEY, OF ALBANY, NEW YORK.

LAWN-RAKE.

SPECIFICATION forming part of Letters Patent No. 415,844, dated November 26, 1889.

Application filed July 31, 1889. Serial No. 319,336. (No model.)

*To all whom it may concern:*

Be it known that I, JOHN P. RADLEY, a citizen of the United States, residing at Albany, in the county of Albany and State of New York, have invented a new and useful Lawn-Rake, of which the following is a specification.

My invention relates to improvements in lawn-rakes; and the object of my invention is to produce a light and durable rake that will pass over the lawn and gather the fine cuttings of grass cut by the mower without injuring the grass by bringing into contact with the tender shoots a sharp point. I attain this object by the mechanism illustrated in the accompanying drawings, in which—

Figure 1 is an elevation of the head of my rake. Fig. 2 is a section along the line $a\,b$ on Fig. 1. Fig. 3 is a plan, and Fig. 4 a section $c\,d$ on Fig. 2.

Similar letters refer to similar parts throughout the several views.

In the upper portion of the head A, I cut the longitudinal groove D, extending across the head from one end to the other. Passing into the groove D from the under side of the head A, I place the ends E of the tooth B, bending the ends of the tooth in such a manner that they will lie within the groove and parallel thereto and point away from the center of said tooth. The tooth B is usually constructed of wire, and is bent at the point where it passes from the lower surface of the head at such an angle that the sides of the tooth will remain in close contact with the lower surface of the head, forming the shoulder J, (see Fig. 2,) extending forward to the front of the head. It is then bent at right angles to the shoulder J and extends downward until very near the end of the tooth, when it is bent at almost or quite a right angle toward the rear of the head of the rake and proceeds a short distance in that direction, forming a foot, which passes along the surface of the lawn during the operation of the rake. My tooth is composed of a single piece of wire having two parallel sides joined at the end of the foot and having their ends secured within groove D, as already stated. It is apparent that the formation of the end of the foot may be made square, as shown by full lines in Fig. 4; or it may be semicircular in form, as shown by dotted lines $F^2$. It is, however, advisable not to make the end of the foot V-shaped, since that would occasion the use of the point at the end of the foot of the tooth, which would prevent the result that we are most desirous of obtaining—namely, a blunt tooth that cannot by any possibility injure the grass. My tooth is held more steadily in position by means of the ends being turned down within the groove D, preventing the tooth from being turned within the head. The shoulder J, by the construction of which the tooth is kept in close contact with the head, fastens the tooth and holds it more securely in its position than could be obtained by constructing the tooth without it. The parallel sides of the tooth also add to its solidity and usefulness.

To the side of the head I attach, by means of the socket S, secured to the side of the head in a suitable manner, the handle H. I connect the ends of the head of the rake to the handle by means of the ornamental braces L. By attaching the handle to the head by means of the socket S, I do away with the necessity of weakening the head by puncturing it with the handle, as is usually done. Secured to each end of the head and passing over the groove D, I place the metallic plate C, secured to the head by means of suitable screws or brads. The plate C serves the double purpose of concealing the ends of the tooth and ornamenting the head of the rake.

A very important and essential part of my invention is the foot F, which slides along easily on the surface of the lawn, having a broad bearing on the grass, and acts as a gage to the rake, and, being blunt at the end, cannot possibly injure the turf, in this respect differing materially from the ordinary rake, whose points dig into the grass and serve to mutilate and tear up the shoots. The sides of the tooth may be made quite close together and the teeth placed so close to each other that the very finest cuttings may be readily and securely gathered by my rake.

My invention is extremely simple in its construction, inexpensive in manufacture, because of its parallel sides and shoulder fitting close to the under side of the head of the rake, together with the mode of fastening the ends within the groove in the head of the rake, a very light wire may be used, and it performs the work required of it in an extremely satisfactory manner.

What I claim as my invention, and desire to secure by Letters Patent, is—

1. In a lawn-rake, a tooth consisting of a single piece of wire bent midway between its ends, forming a blunt toe at the end of the foot F, having its sides parallel, its ends attached to the head of the rake, the sides bent at a point where they pass from the lower surface of the head, forming the shoulder J, in contact with the lower surface of the head, then bent downward at an angle with the shoulder J, and near the toe bent toward the rear of the head of the rake, forming the foot F, in contact with the surface of the lawn when in operation, substantially as described, and for the purpose as set forth.

2. In a lawn-rake, the combination, with a grooved rake-head A, adapted to receive the tooth B, with said tooth consisting of a single piece of wire bent midway between its ends, forming a blunt toe at the end of the foot F, having its sides parallel, its ends attached to the head of the rake, the sides bent at a point where they pass from the lower surface of the head, forming the shoulder J, in contact with the lower surface of the head, then bent downward at an angle with the shoulder J, and near the toe bent toward the rear of the head of the rake, forming the foot F, in contact with the surface of the lawn when in operation, substantially as described, and for the purpose as set forth.

JOHN P. RADLEY.

Witnesses:
FREDERICK W. CAMERON,
JOHN N. MAYER.